May 3, 1966 H. SILVER 3,249,701

FLUID SUPPORTED TRANSDUCER WITH LATERALLY STRESSED RESILIENT FLEXIBLE DIAPHRAGM

Filed Dec. 28, 1961 3 Sheets-Sheet 1

INVENTOR.
HAROLD SILVER
BY Morris A. Rabkin
ATTORNEY

May 3, 1966 H. SILVER 3,249,701

FLUID SUPPORTED TRANSDUCER WITH LATERALLY STRESSED RESILIENT FLEXIBLE DIAPHRAGM

Filed Dec. 28, 1961 3 Sheets-Sheet 2

INVENTOR.

HAROLD SILVER

BY Morris ... Rabkin

ATTORNEY

May 3, 1966 H. SILVER 3,249,701
FLUID SUPPORTED TRANSDUCER WITH LATERALLY STRESSED RESILIENT FLEXIBLE DIAPHRAGM
Filed Dec. 28, 1961 3 Sheets-Sheet 3
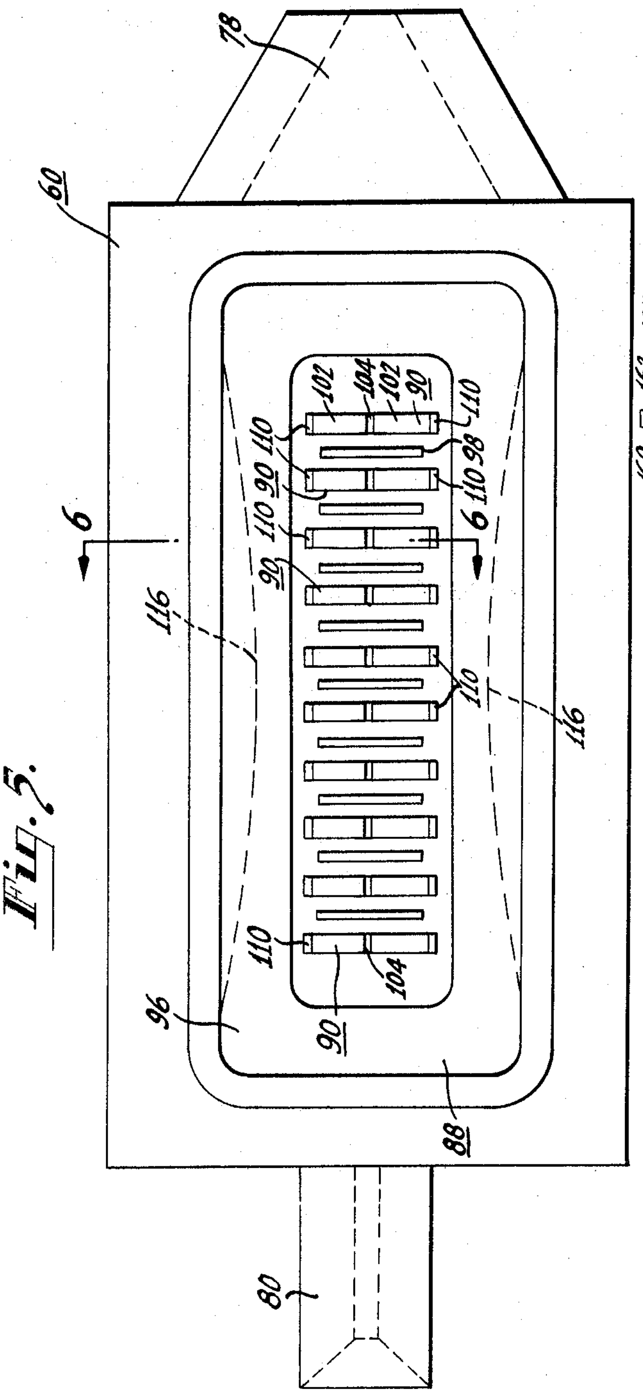
Fig. 5.
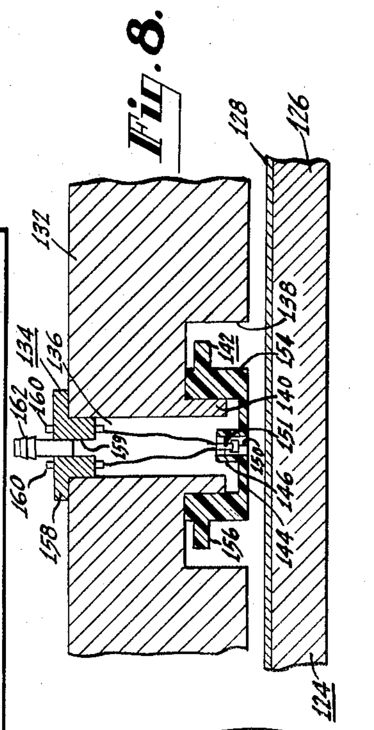
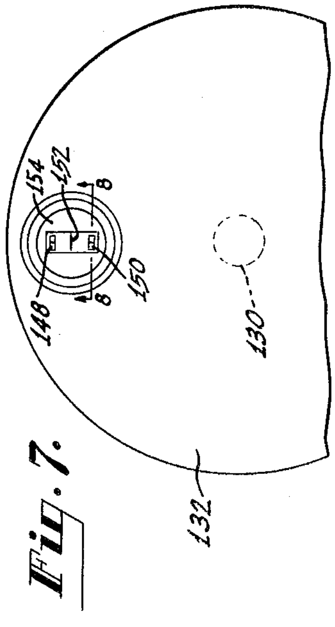
INVENTOR.
HAROLD SILVER
BY Morris h. Rabkin
ATTORNEY United States Patent Office 3,249,701

Patented May 3, 1966

3,249,701

FLUID SUPPORTED TRANSDUCER WITH LATERALLY STRESSED RESILIENT FLEXIBLE DIAPHRAGM

Harold Silver, Riverton, N.J., assignor to Radio Corporation of America, a corporation of Delaware Filed Dec. 28, 1961, Ser. No. 162,900
16 Claims. (Cl. 179—100.2)

This invention relates to fluid supported apparatus, and more particularly to apparatus for hydrodynamically or hydrostatically supporting a transducer on a fluid medium.

The invention is especially suitable for use in magnetic recording and reproducing apparatus wherein it is desired to support a magnetic head in signal transducing relationship with a magnetic record, such as a magnetic drum or disc record, without the head coming into physical contact with the surface of the record.

It is important that the spacing between the magnetic head and the record surface remain constant regardless of irregularities in the record surface or run-out of the record or in the drive mechanism therefor. In known arrangements for supporting a magnetic head on fluid bearings, spring suspensions have been used to allow the magnetic head and its support to follow run-out or record surface irregularities. These known arrangements have not been entirely satisfactory for many reasons. For example, the setting of a head may change due to fatigue in and relaxation of the spring suspension thereof. Spring suspensions often rigidity and position stability and may permit the head to vibrate or shift position. Heads having spring suspensions ordinarily do not accommodate rapid or high frequency spacing variations. Slight protuberances or waviness, common in coatings of granular magnetizable material used on many magnetic disc and drum records, cause rapid, high frequency head-to-record surface spacing variations. Disc records may also vibrate in various high frequency modes when driven at very high speeds (e.g., 300 revolutions per second) during operation. Noise components in the form of amplitude modulation of the signals recorded on or reproduced from a magnetic record by a floated head are introduced by the failure of the head to follow spacing variations. Such noise is often a serious problem in systems using floated heads. By a floated head is meant a head and an arrangement for supporting the head on a hydrodynamic or hydrostatic fluid bearing, such as an air bearing.

Various types of spring suspensions are used in floated heads. These include cantilever springs, leaf springs, pivoted springs and even more complicated spring mechanisms. These spring suspensions usually require difficult and sometimes tedious adjustments requiring a great deal of skill on the part of a technician. Many known floated heads are also quite expensive because of their use of complex spring suspensions.

Accordingly, it is an object of this invention to provide improved fluid supported apparatus, especially adapted for use in floated magnetic heads, wherein defects attributable to spring suspensions of known floated heads are substantially eliminated.

A further object of this invention is to provide apparatus for supporting a record transducer on fluid bearings, which apparatus maintains substantially constant spacing between the transducer and a record surface in spite of such surface irregularities as can cause high frequency spacing variations.

A further object of this invention is to provide an improved magnetic recording and reproducing system of the type using floated magnetic heads which is more immune to noise than known systems of this type.

A still further object of this invention is to provide an improved arrangement for supporting a record transducer on a fluid bearing which is both easier to adjust and simpler in construction than known arrangements of this type.

A still further object of this invention is to provide an improved fluid supported record transducer having support surface characteristics which permit very close spacing between the transducer and a record surface.

A still further object of this invention is to provide an improved apparatus for fluid support of a record transducer which is readily adaptable to hydrostatic or to hydrodynamic operation, and is thereby useful in applications involving either low or high fluid velocities.

Briefly described, fluid supported apparatus embodying the present invention includes a flexible support member which may carry a record transducer and which, with another surface, such as a record surface, defines a fluid bearing. The support member is desirably resiliently yieldable and is assembled in a manner to have a natural or resonant frequency which is at least of the order of the frequency of variations in spacing between the record surface and the surface of the support member at its highest intended speed. Accordingly, the support surface can follow any such spacing variations and maintain the spacing constant.

In a preferred embodiment of the invention, the support member is in the form of a diaphragm. Means including a chamber sealed by the diaphragm may be pressurized to advance the support member into floating position. The diaphragm may be radially stressed to have a high resonant frequency of vibration. Also, the arrangement is simple in construction and readily adjustable by controlling the pressurization of the chamber. The diaphragm may have a convex shape when the chamber is pressurized. A transducer mounted in the uppermost part of the diaphragm is therefore very close to a record surface.

The invention itself, both as to its organization and method of operation, as well as additional objects and advantages thereof, will become more readily apparent from a reading of the following description in connection with the accompanying drawings, in which:

FIG. 5 is a bottom plan view of the head shown in FIG. 4;

FIG. 7 is a bottom plan view of magnetic disc recording and reproducing apparatus embodying the invention; and FIG. 8 is a fragmentary, enlarged, sectional view of the apparatus of FIG. 7, taken along the line 8—8 thereof.

Figures 1, 2, 3:
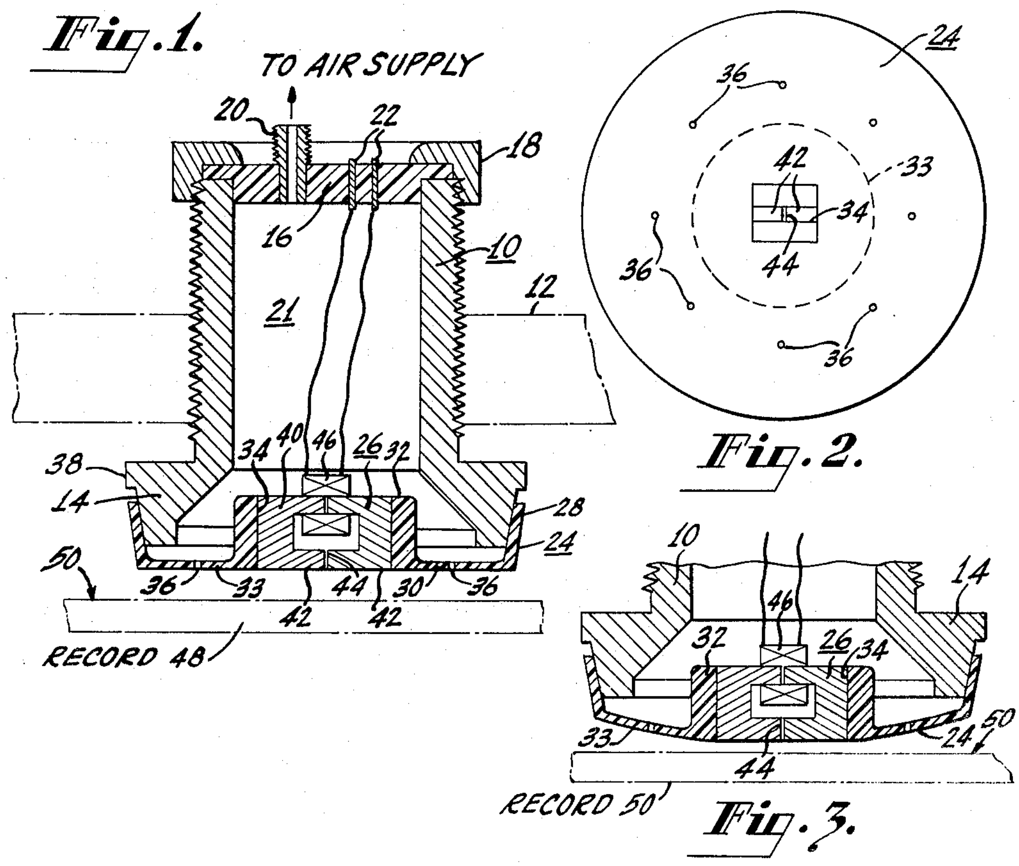
FIG. 1 is a sectional view of a mounting for a floated head in accordance with the invention.
FIG. 2 is a bottom plan view of the floated head shown in FIG. 1.
FIG. 3 is a fragmentary, sectional view similar to FIG. 1 with the head positioned in operating relationship with a magnetic record.

Referring more particularly to FIGS. 1 and 2 of the drawings, there is shown a generally hollow body 10 which is threaded into a base 12, shown in phantom. Means (not shown), such as a micrometer screw arrangement, may be used to move the body 10 in an axial direction with respect to the base 12 without rotating the body 10. The body 10 has an enlarged bottom or shoe portion 14 which is internally flared outwardly. The entire body 10 may be machined from aluminum. The top of the body 10 is sealed by a disc 16 which may be of plastic and serves as a gasket. This disc is held in place by a clamping ring 18 which screws on external threads on the body 10. The disc 18 receives a hollow plug 20 which is externally grooved or threaded. An air supply hose or coupling (not shown) may be secured to the plug 20 in air tight relationship therewith. Terminals 22 are also mounted in the disc 16 and sealed thereto. The disc 16 may be entirely of insulating material, as shown, or only the portion thereof including the terminals 22, may be of insulating material.

Figure 4:
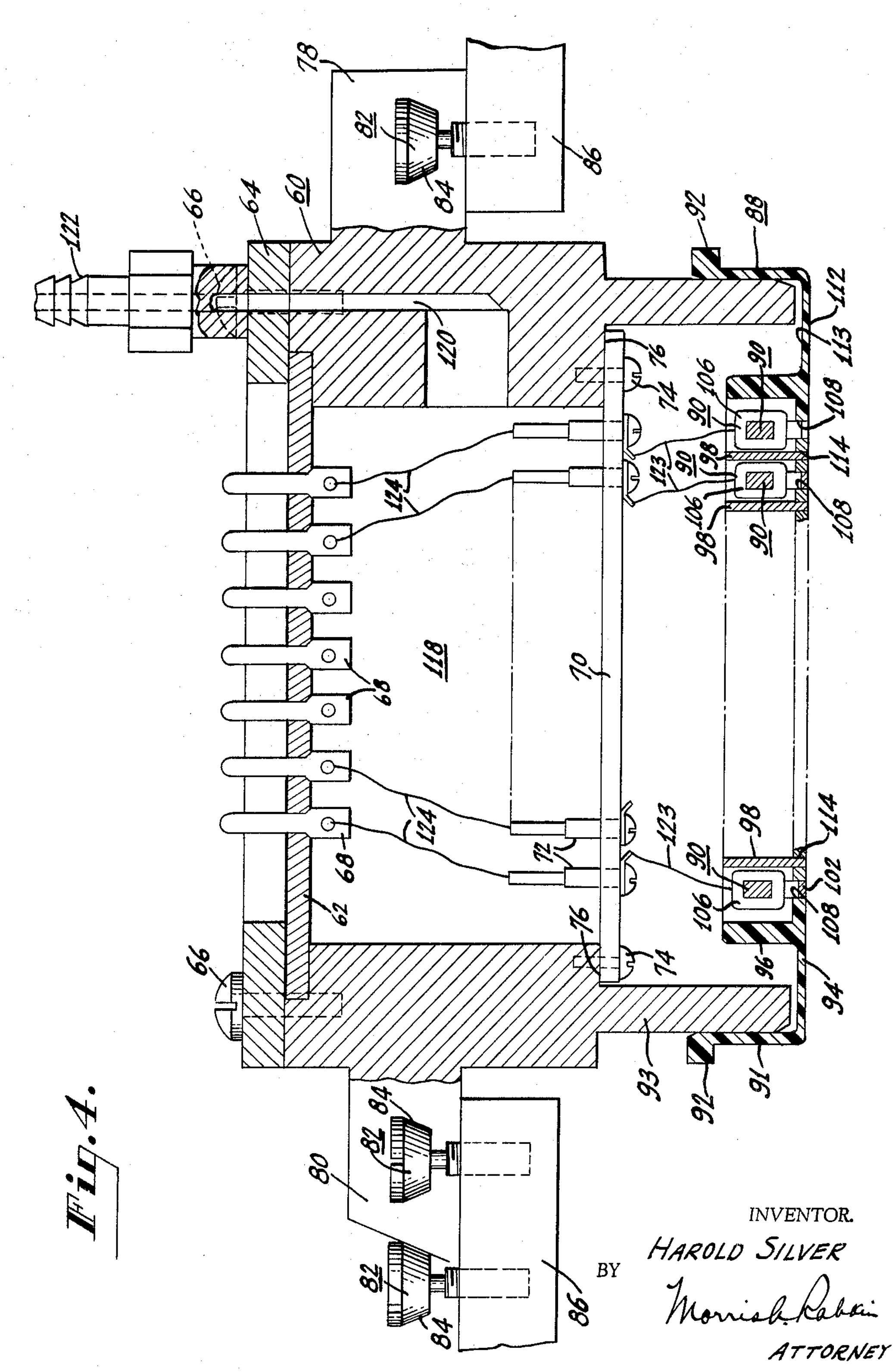
FIG. 4 is a sectional view of an air floated multichannel magnetic head embodying the invention.

A diaphragm 24 which serves as a support member for a magnetic head 26 is secured to the shoe 14. The diaphragm is circular or cup shaped and has a cylindrical rim 28, a resilient, flexible web 30, and a centrally disposed cylindrical receptacle 32 for receiving the magnetic head 26 in a slot 34 in the receptacle. The diaphragm 24 is desirably made from non-magnetic material which is strong enough so that the web portion 30 thereof can be made very thin to achieve high flexibility. A suitable material from which the diaphragm 24 may be machined is titanium. The thickness of the web 30 of the diaphragm 24 is exaggerated in FIG. 1 in the interest of clarity. In practice it may be relatively much thinner than shown. A plurality of holes 36 may be drilled along a circle concentric with the center of the diaphragm. Alternatively, the web 30 may be of porous material such as sintered stainless steel. The holes 36 or porous material are not used in many applications, as will be explained hereinafter. The diaphragm is held on the shoe 14 by a press or force fit. This press or force fit may be obtained in either of two ways, one of which is illustrated in FIG. 1 and the other of which is illustrated in FIG. 4 and FIG. 8. The force fit obtained as illustrated in FIGS. 4 or 8 is considered to be preferable. A variable press fit is obtained by the manner of assembly illustrated in FIG. 1, now to be described.

The outer surface of the shoe 14 below a shoulder 38 is tapered inwardly downwardly. The rim 28 is perpendicular to the web 30 before the diaphragm 24 is assembled with the shoe 14. Upon assembly, the rim 28 flares outwardly. The diaphragm 24 is held on the shoe by the friction between the inner, peripheral surface of the rim 28 and the outer, peripheral surface of the shoe 14. This means of assembly has the important advantage of applying lateral or radial stresses to the web 30 of the diaphragm 24. Such radial stresses in the web 30 increase the resonant frequency of vibration of the assembly including the diaphragm, the head 26 and the shoe 14. The amount of taper of the outer peripheral surface of the shoe 14 has been exaggerated in the interest of clarity of illustration.

The magnetic head 26 includes a generally rectangular core structure 40 of magnetic material such as ferrite or Mu-metal laminations. Mu-metal is a known iron, nickel, copper alloy. The core has pole portions 42 which define a signal gap 44. A coil 46 is wound around the back of the core 40. The ends of this coil are connected to the terminals 22. The slot 34 in which the head 26 is received may, after the head is inserted in place, be filled or potted with a potting resin of the epoxy type so that the head 26 is held in place firmly. The surface of the pole portions 42 of the head are disposed opposite to the recording surface 50 of the record 48. Signals to be recorded on a magnetic record 48 shown in cooperable relationship with the head 26 may be applied to the coil 46 by way of the terminal 22. These signals are translated into variations in magnetic flux which fringes across the signal gap 44 and is recorded on the recording surface 50, of the record 48. The head 26 may also be used to pick-up signals in the form of variations in magnetization of incremental areas of the surface 50 and translate this recorded flux into output signals which may be derived at the terminals 22. The electronic systems for recording and reproducing information on and from the magnetic record 48 may be of a type known in the art.

The record 48 may be a magnetic disc record which is driven by a drive mechanism of the type known in the art. The recording surface 50 of the record 48 may be provided by a coating of magnetizable material which is disposed thereon by techniques known in the art. The record may be rotated at very high speeds such that, if the magnetic head or any portions of the surface of the diaphragm 24 were to come in contact with the surface 50, the diaphragm surface 33, the head 26 and/or the recording surface itself might very likely be damaged. Accordingly, it is desirable to maintain a constant, but very close, spacing (e.g., of the order of 100 microinches) between the surface of the pole portions 42 of the head and the recording surface 50 of the record. The spacing should be constant regardless of surface irregularities in the coating 50 or run-out of the drive system for the record 48. Since the record rotates at high speed and the surface irregularities and run-out appear as high frequency spacing variations. Moreover, a disc record rotating at high speed naturally vibrates in complex modes, much like a cymbal. Such vibrations may be at high frequencies. The frequency of the spacing variations due to natural vibration, run-out and surface irregularities of the record may be in the range of ten times the rotational speed of the record. Thus, with a record which rotates at 300 revolutions per second, the spacing variation may be at 3000 cycles per second. It is therefore desirable for the natural frequency of the floated head assembly to be very high or at least comparable with the vibrational frequency of the record, so that the floated head can follow the spacing variations precisely. The diaphragm 24 can move toward or away from the surface 50 at a corresponding or greater rate because of the high resonant frequency of vibration of the vibrating system including the diaphragm.

The diaphragm 24 is shown in operating position in FIG. 3. In order to place the floated head unit in operating position, pressurized air is admitted through the plug 20 into an air tight chamber 21 defined by the body 10, the disc 16 and the diaphragm 24. This pressurized air applies forces against the diaphragm 24 and biases the web and receptacle portions thereof toward the recording surface 50 of the record 48. The spacing of the surface 33 of the diaphragm 24 and the recording surface 50 is readily and easily controllable by adjusting the air pressure in the chamber 21.

It is well known that when a magnetic disc record moves at high speed past a cooperating support member surface which mounts a magnetic head, a hydrodynamic air bearing is formed between the disc and the head support member. The thickness of this air bearing is known to be a function of the shape and size of the support member surface, the velocity of the air in the bearing, and the loading force applied against the support member. The hydrodynamic air pressure in the bearing between the surfaces 33 and 50 produces a force on the diaphragm 28 which opposes the force thereon due to the pressure in the chamber 21. The diaphragm then assumes an initial equilibrium spacing with respect to the record. When the spacing or clearance between the surfaces 33 and 50 decreases, the hydrodynamic air pressure in the bearing increases. The diaphragm deflects inwardly in response to the increased bearing air pressure, to a new equilibrium spacing from the record surface 50. This new equilibrium spacing is the same as the initial equilibrium spacing. When the record moves away from the diaphragm, the pressure in the bearing drops. The diaphragm then deflects outwardly to another new equilibrium position wherein the spacing between the diaphragm surface 33 and the record surface 50 is the same as the initial spacing therebetween.

The surface 33 becomes convexly curved outwardly when the chamber 21 is pressurized. The signal gap 44 of the head 26 is disposed at the center of the convex diaphragm surface. Thus, the signal gap is closer to the recording surface than any of the portions of the surface 33 of the diaphragm 28. Thus, the magnetic head may readily be disposed in very close transducing relationship with the recording surface simply by adjusting the air pressure in the chamber 21, since this changes the curvature of the surface 33.

Since the web 30 of the diaphragm 24 is both resilient and flexible, it allows the head 26 to move toward or away from the recording surface 50, as explained above, and thereby the head maintains a constant spacing from the surface 50 despite surface irregularities and run-out which would tend to change the spacing between the head and recording surface 50. The thickness of the web and the general configuration of the floated head assembly provide for a high resonant frequency of vibration of the assembly which is at least of the order of the spacing variations caused by run-out, surface irregularities and the like in the system. Accordingly, the spacing between the surface 33 and the recording surface 50 can be maintained constant with a high degree of accuracy.

The holes 36 in the web 30 are ordinarily unnecessary for those uses of the floated head which involve records which move at high velocity, such as magnetic discs and magnetic drums of the type known in the art, since a hydrodynamic air bearing will naturally be formed between the surface 33 of the diaphragm and the recording surface 50 of the record. There are applications for floated heads, however, where it is difficult to provide a hydrodynamic bearing, particularly where the record rotates at relatively slow speed. For such applications, the holes 36 permit some of the pressurized air in the chamber 21 to be vented through the diaphragm 24 into the space between the recording surface 50 and the surface 33 of the diaphragm 24. This air provides a hydrostatic bearing, which serves to separate the record and the diaphragm. The constancy of spacing between the surface 33 and the recording surface 50 is maintained to a high degree of accuracy by reason of the high natural frequency of vibration of the floated head assembly.

Figure 6:
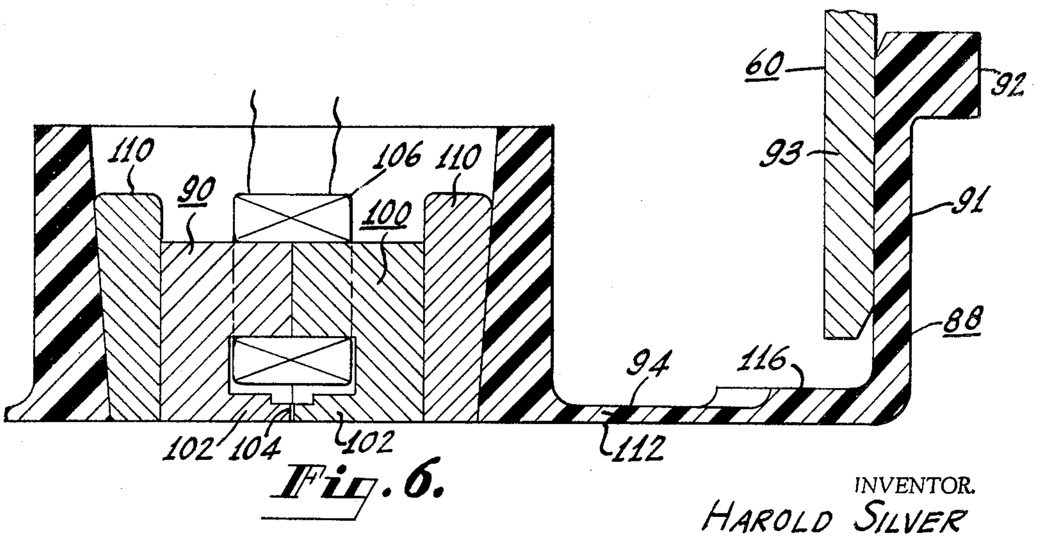
FIG. 6 is a fragmentary, enlarged, sectional view taken along the line 6—6 of FIG. 5.

A multi-channel air floated head embodying the invention is shown in FIGS. 4, 5 and 6. By a multi-channel is meant a head which is capable of simultaneously scanning a plurality of record tracks on a magnetic record. Such heads are particularly suitable for computer apparatus, since the bits comprising a character of digital information may be recorded or reproduced simultaneously in parallel relationship with each other, each on a different one of the plurality of record tracks.

The illustrated multi-channel floated head includes a hollow, generally rectangular body 60 which is sealed at one end by a plate like gasket 62. The gasket 62 is held down on the body 60 by a centrally open hold-down plate 64 which is fastened to the body 60 by means of screws 66. Terminals 68 are mounted in air tight fashion in the plate 62. These terminals extend through the central opening in the hold-down plate 64 and are available for connection to electronic apparatus providing signals for recording on a magnetic record or picking up signals which are reproduced from a magnetic record by the air floated, multi-channel head. A terminal board 70 having a plurality of terminals 72 thereon corresponding, respectively, to different ones of the terminals 68 is mounted by means of screws 74 on opposite internal shoulders 76 of the body 60.

Tapered flanges 78 and 80 project outwardly from opposite sides of the body 60. These flanges cooperate with screws 82 having tapered screw heads 84. The body rests on a base 86. The screws 82 are set into the base 86. The screws 82 may be turned into or out of the base 86 in order to adjust the position of the multi-channel head. By turning the screws in pairs, the head may be shifted tangentially with respect to a record, skewed, or turned radially. The screws locate the magnetic heads and maintain the position thereof in a simple and convenient manner without additional fasteners.

The bottom of the body 60 is open and is adapted to receive an oblong, generally rectangular diaphragm 88 which serves as a support member for a plurality of magnetic heads 90. The diaphragm 88 includes a rectangular rim 91 which has a lip 92. A web portion 94 thereof interconnects its rim 91 with an oblong receptacle 96 which is a part of the diaphragm 88 and which receives the magnetic heads 90 and shields 98 of magnetic material interposed between adjacent magnetic heads.

The heads include cores 100 of magnetic material having pole portions 102 which define signal gaps 104. Coils 106 are wound around the back parts of the cores 100. These coils are connected to respective ones of the terminals 72. The terminals 72 are interconnected with their corresponding terminals 68. Two terminals 72 on the board 70 and two terminals 68 on the plate 62 are provided for each coil 106. Since these terminals are arranged in parallel rows, only one terminal for each of the coils 106 is shown in FIG. 4. The vibrating heads 123 from the coils 106 are short because of the proximity of the terminal board 70 and the leads. These short leads vibrate at small amplitudes and are not as subject to fatigue fracture as are longer leads, for example, which might connect directly to the terminals 68.

Slots 108 are formed in the bottom of the receptacle 96 for receiving the cores 100 and trapezoidal clamping members 110 (FIG. 6). The inner walls of the receptacle 96 are tapered. The clamping members 110 are set between the sides of the cores 100 and the adjacent walls of the receptacle 96 to clamp the cores firmly in place. The clamping members 110 may be used to shift the position of the signal gap 104 of each head in a lateral direction. By adjusting the clamping members 110, the signal gaps 104 of the heads may all be oriented in aligment with each other (i.e., along a common perpendicular line). The clamping members may also be used to adjust the inductance of each core 100, since the core inductance depends upon the pressure exerted on the heads. Thus, the clamping members may be used to equalize the inductance presented by each of the heads. The pole portions 102 of the core and the ends of the clamping members 110 are all in flush alignment with the bottom surface 112 of the diaphragm 88. Exact flush alignment may be obtained by lapping, if necessary. This bottom surface is disposed opposite to the recording surface of a record with which the multi-channel head cooperates in a manner similar to the surface 33 of the diaphragm 24 (FIG. 1).

Slots 114 in the bottom and side walls of the receptacle 96 serve to receive the shields 98. After the head 91 and shields are assembled, the receptacle may be filled with a potting compound such as an epoxy resin which, when it sets, holds the heads and shields firmly in place.

The web 94 of the diaphragm 88 is generally highly flexible and resilient. However, the web is thicker in some parts thereof than in others. Flared thicker portions 116 of the web are disposed along the longer side edges thereof internally of the web. These portions are of greatest width near the center of the web and diminish in width as they taper down toward their respective side edges of the web. Because of these flared thicker portions 116, the web is more flexible near the ends thereof than centrally thereof. Accordingly, deflections of the web along the line including all of the signal gaps 104, which line corresponds to the center line of the diaphragm, are equal for uniform air pressure applied to either the outer surface 112 or the inner surface 113 of the diaphragm. In a similar manner, the web portions 116 may be displaced away from a symmetrical position about the central channel in order to take into consideration the variation in velocity and, consequently, hydrodynamic film pressure in order to maintain a constant clearance to the record surface.

The rim 91 is secured by force or press fit to the outside wall of the bottom portion in a way somewhat different from that described in connection with FIG. 1. The rim has straight sides, as does the outer periphery of the lower part 93 of the body 60. However, the dimensions of the inner periphery of the rim 91 are approximately the same as or slightly smaller than the lower body part 93. The inner edge of the rim 91 opposite from the lip 92 is beveled, as is the outer edge of the lower body part 93. The lower body part 93 and the diaphragm may be assembled by a force or press fit. Accordingly, the web 94 is laterally stressed upon assembly with the body 60. The air floated head assembly therefore has a very high resonant frequency of vibration and is capable of following high frequency variations in spacing between the recording surface and the surface 112 of the diaphragm 88. Thus, the spacing between the pole portions of each of the heads 91 and the recording surface is maintained constant with high precision. Air is supplied to the chamber 118 inside the body 60 which is defined by the plate 62, the diaphragm 88 and the inner walls of the body 60, through a passage 120 which is drilled into the body 60. A hollow plug 122 is secured to the body 60 and communicates with the passage 120. A hose may connect a compressor or other source of pressurized air to the plug 122. The chamber 118 is pressurized to bias the web 94 of the diaphragm 88 whereby to deflect the web 94 and dispose the heads 90 in operating position with respect to the recording surface of a magnetic record. The flared thicker portions 116 of the web 94 insure that each of the heads will be at the same distance from the recording surface, since all of the heads are deflected by like amounts due to the air pressure applied to the inside surface of the diaphragm 88.

Referring to FIGS. 7 and 8, there is shown apparatus for recording and reproducing information on a magnetic disc 124. This disc may be of the type used in high speed computer disc memories. It includes a base disc 126 made of aluminum or some other non-magnetic material having a high tensile strength. The disc has a coating 128 of magnetizable material thereon. A drive system (not shown), which may be of known design, is coupled to the disc by way of a shaft 130 and is adapted to drive the disc at very high speeds (for example, 300 revolutions per second).

A cover plate 132 is spaced closely adjacent to the recording surface of the disc which is defined by the coating 128 of magnetizable material. This cover plate may have a plurality of magnetic head assemblies embodying the features of the invention mounted therein. These assemblies may be spaced radially and circumferentially with respect to each other so that they may record and reproduce on either the same or different ones of a pluarlity of adjacent record tracks on the recording surface of the record 124. One of these magnetic head assemblies 134 is shown in FIGS. 7 and 8, by way of illustration.

The illustrated magnetic head assembly 134 is provided by first drilling a hole 136 through the cover plate 132 in a desired location thereon. An annular slot 138 is also drilled concentrically with the hole 136 from the bottom of the plate 132. The cylindrical projection 140 which remains between the hole 136 and the slot 138 is milled away somewhat so that the end of the cylindrical projection is undercut with respect to the bottom of the plate 132.

The magnetic head assembly includes a diaphragm 142. This diaphragm includes a web 144 which has a receptacle 146 for receiving a pair of magnetic heads 148 and 150 and a shield 152. The web 144, similarly with the webs of the diaphragms of the previously described embodiments of the present invention, is a thick, flexible member. The web extends from the rim 154 of the diaphragm. The rim is a cylindrical member the upper internal edge of which is beveled. A lip 156 on the outer periphery of the rim 154 aids in the assembly thereof. The diaphragm 142 is assembled with the cylindrical projection 140 by a press fit. Since the upper, inner peripheral edge of the rim 154 is beveled, the cylindrical projection 140 may be inserted into the cup formed by the rim 154. The diaphragm may then be pressed upwardly into a desired position by pressure applied on the lip 156. The inner, peripheral dimensions of the diaphragm are the same or slightly smaller than the outer dimensions of the projection 140. The web 144 is, therefore, radially stressed when the diaphragm is mounted. It follows that the diaphragm assembly has a high natural frequency of vibration.

A plug 158 is used to seal the hole 136. This plug may be of some resilient, air-tight plastic such as synthetic rubber. Terminals 160, which are mounted in air tight relationship with the plug 158 and which extend therethrough, are provided for connection to the coil 151 of the heads 148 and 150. A connector 162 for a coupling or air hose is disposed in a hole 159 in the plug 158. Air from a source of pressurized air is applied through the connector 162 and pressurizes the chamber defined by the plug 158, the diaphragm 142 and the inner periphery of the hole 136. By pressurizing this chamber, the diaphragm web 144 may be deflected into a convex shape and disposed in proper floating and transducing relationship with respect to the magnetic record 124.

The mode of operation of the head assembly while floating on a hydrodynamic air bearing is similar to the mode of operation of the assembly shown in FIG. 1 and accordingly will not be described in detail at this point. The heads 148 and 150 may be very close together so that they deflect approximately the same distance. If the heads are more widely separated, the thickness of the diaphragm may be changed so that its stiffness is altered in different portions, as in the case of the diaphragm 88 (FIGS. 4 to 6). Accordingly, each head 148 and 150 may be made to deflect an equal distance in response to the pressure in the channel and in the air bearing.

Although an annular diaphragm and two heads have been shown in FIGS. 7 and 8, it will be appreciated that, by changing the shape of the slot 138 and the projection 140, an oblong diaphragm which carries a multiplicity of magnetic heads (such as shown in FIGS. 4 to 6) may be mounted in the cover plate 132.

Although the use of a cover plate or housing for a disc record to provide a mounting for a magnetic head assembly in accordance with the invention has been shown in FIGS. 7 and 8, it will be appreciated that the cylindrical housing or cover for a magnetic drum may similarly be adapted for mounting head assemblies in accordance with the invention.

While the invention has been described as applied to magnetic recording and reproducing apparatus, the invention may be useful generally in providing fluid bearings for supporting other devices.

From the foregoing description, it will be apparent that there have been provided certain improvements in floated heads. While air flotation is utilized in the illustration, heads which are described herein may use other fluids, whether liquids or gases. Variations in the herein described floated head assemblies and in parts thereof, all within the scope of the present invention, will, no doubt, become apparent to those skilled in the art. Accordingly, the foregoing description should be considered illustrative and not in any limiting sense.

What is claimed is:

1. Apparatus for cooperation with a member presenting a bearing surface, which apparatus comprises:

(a) a flexible, resilient support member having a surface adapted to be spaced from said bearing surface by a flowing fluid;

(b) said support member surface being movable toward and away from said bearing surface in response to variations in fluid pressure between said surfaces;

(c) means mounting said support member under a lateral stress, said lateral stress being of a magnitude causing said support member to exhibit a resonant frequency of vibration at least of the order of the frequency of said variations in fluid pressure whereby said support member surface can follow said variations to maintain the spacing between said surfaces constant; and (d) means for applying fluid pressure against said member to bias said member into operating position with respect to said bearing surface.

2. Fluid supported apparatus adapted to cooperate with a bearing surface, which apparatus comprises:

(a) a flexible, resilient member presenting a bearing surface opposed to said first-named bearing surface and adapted to be spaced therefrom by a fluid bearing;

(b) said member being movable toward and away from said first-named bearing surface in response to variations in fluid pressure between said surfaces;

(c) means for applying fluid pressure against said member to bias said member into operating position with respect to said bearing surface; and (d) means for mounting said member under a lateral stress, said lateral stress being of a magnitude causing said support member to exhibit a resonant frequency of vibration at least of the order of the frequency of said variations in fluid pressure so that said member can follow said variations to maintain the spacing between said member and said bearing surface constant.

3. Apparatus for supporting a transducer in spaced relation with a record surface, which apparatus comprises:

(a) a flexible, resilient support member for said transducer, said support member presenting a surface opposed to said record surface, said transducer being disposed in said support member surface;

(b) said record and said support member being relatively movable to develop a hydrodynamic bearing between said member surface and said record surface with said support member surface being movable toward and away from said record surface in response to variations in fluid pressure between said surfaces;

(c) means for mounting said support member under a lateral stress, said lateral stress being of a magnitude causing said support member to exhibit a resonant frequency of vibration at least of the order of the frequency of said variations in fluid pressure so that said support member surface can follow said variations to maintain the spacing between said surfaces constant;

(d) fluid supply means for applying fluid pressure against said support member for deflecting said support member into floating position on said hydrodynamic bearing whereby said transducer is positioned in transducing relationship with said record surface.

4. Apparatus for supporting a transducer in spaced relation to a record surface, which apparatus comprises:

(a) a flexible, resilient support member for said transducer, said support member presenting a surface opposed to said record surface, said transducer being disposed flush with said support member surface, said support member surface being movable toward and away from said record surface in response to variations in fluid pressure between said surfaces;

(b) means for mounting said support member under a lateral stress, said lateral stress being of a magnitude causing said support member to exhibit a resonant frequency of vibration at least of the order of the frequency of said variations in said fluid pressure so that said support member surface can follow said variations to maintain the spacing between said surfaces constant;

(c) fluid supply means for applying fluid pressure against said support member for deflecting said support member toward said record surface to position said transducer in transducing relationship with said record surface;

(d) said flexible support member having an orifice therein for exhausting said fluid through said support member into the space between said record surface and said support member surface to establish a hydrostatic bearing therebetween.

5. Apparatus for supporting a transducer in spaced relation to a record surface, which apparatus comprises:

(a) a flexible, resilient support member for said transducer, said support member presenting a surface opposed to said record surface, said transducer being disposed on said support member surface, and said record and said support member being relatively movable to develop a hydrodynamic bearing between said member surface and said record surface, said support member surface being movable toward and away from said record surface in response to variations in fluid pressure between said surfaces;

(b) fluid supply means for applying fluid pressure against said support member for deflecting said support member into floating position on said hydrodynamic bearing whereby said transducer is positioned in transducing relationship with said record surface; and (c) means mounting said support member under a lateral stress, said lateral stress being of a magnitude causing said support member to exhibit a resonant frequency of vibration at least of the order of the frequency of said variations in said fluid pressure so that said support member surface can follow said variations to maintain the spacing between said surfaces constant.

6. Apparatus for supporting a transducer in spaced relation to a record surface, which apparatus comprises:

(a) a flexible, resilient support member for said transducer, said support member presenting a surface opposed to said record surface, and said transducer being disposed on said support member surface, said support member surface being movable toward and away from said record surface in response to variations in fluid pressure between said surfaces;

(b) fluid supply means for applying fluid pressure against said support member for deflecting said support member toward said record surface for positioning said transducer in transducing relationship with said record surface;

(c) said flexible support member having an orifice therein for exhausting the fluid from said supply means, through said support member, into the space between said record surface and said support member surface to establish a hydrostatic bearing therebetween; and (d) means mounting said support member under a lateral stress, said lateral stress being of a magnitude causing said support member to exhibit a resonant frequency of vibration at least of the order of the frequency of said variations in said fluid pressure so that said support member surface can follow said variations to maintain the spacing between said surfaces constant.

7. Apparatus for supporting a transducer in spaced relation to a record surface, said apparatus comprising:

(a) a flexible, resilient diaphragm for supporting said transducer, said diaphragm having a surface opposed to and spaced from said record surface, said diaphragm being movable toward and away from said record surface in response to variations in fluid pressure between said diaphragm and said record surface;

(b) a hollow, open-ended body, (c) means for mounting said diaphragm under a lateral stress, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant; and (d) pneumatic means for pressurizing said chamber for flexibly expanding said diaphragm into operating position closely adjacent said record surface, said record surface being relatively movable with respect to said diaphragm surface to establish a hydrodynamic air bearing therebetween.

8. Apparatus for supporting a transducer in spaced relation to a record surface, which apparatus comprises:

(a) a diaphragm having a thin, resilient, flexible web and a rim around said web;

(b) means for mounting said transducer on said diaphragm in alignment with a surface of said web thereof, said web surface being opposed to and spaced from said record surface so that an air bearing can be established therebetween, said diaphragm being movable toward and away from said record surface in response to variations in fluid pressure between said diaphragm and said record surface;

(c) a hollow, open-ended body, means for mounting said diaphragm under a lateral stress over the open end of said body, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant, said diaphragm and said body defining a chamber; and (d) pneumatic means for pressurizing said chamber whereby to flex said diaphragm surface into convex shape and to position said transducer closely adjacent to said record surface.

9. Fluid supported apparatus cooperable with a bearing surface, said apparatus comprising:

(a) a diaphragm having a flexible, resilient web portion surrounded by a rim, said diaphragm being movable toward and away from said bearing surface in response to variations in fluid pressure between said diaphragm and said bearing surface;

(b) a body open at one end and having a chamber therein communicating with said open end, means for mounting said diaphragm under a lateral stress over the open end of said body with the inner periphery of said rim being secured on the outer periphery of the open end of said body in press fit relationship, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant; and (c) means for pressurizing said chamber for deflecting said web into cooperating position with said bearing surface.

10. A magnetic head adapted to be floated on a fluid bearing over a record surface, said head comprising:

(a) a flexible, resilient diaphragm of oblong shape having a surface adapted to be spaced from said record surface by said fluid bearing, said diaphragm surface being movable toward and away from said record surface in response to variations in fluid pressure between said surfaces;

(b) a plurality of cores of magnetic material mounted in said diaphragm with each core having a pole portion for cooperation with said record surface;

(c) means for mounting said diaphragm under a lateral stress, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant; and (d) fluid pressure means for deflecting said diaphragm toward said record surface.

11. Fluid supported apparatus cooperable with a bearing surface, said apparatus comprising:

(a) a diaphragm having a planar, flexible, resilient web surrounded by a rim integral with said web and disposed perpendicularly with respect thereto, said diaphragm being movable toward and away from said bearing surface in response to variations in fluid pressure between said surfaces;

(b) a body open at one end and having a chamber therein communicating with said open one end, the outer periphery of said one end being of substantially the same shape as said rim and having substantially the same dimensions as the outer periphery of said rim, means for mounting said diaphragm under a lateral stress over the open end of said body by securing the inner periphery of said rim on the outer periphery of the open end of said body in press fit relationship, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant; and (c) means for pressurizing said chamber for deflecting said web into cooperating relation with said bearing surface.

12. Fluid supported apparatus cooperable with a bearing surface, said apparatus comprising:

(a) a diaphragm having a flexible, resilient web of disc form surrounded by a cylindrical rim, said diaphragm being movable toward and away from said bearing surface in response to variations in fluid pressure between said diaphragm and said bearing surface;

(b) a body open at one end and having a chamber therein communicating with said open end, the outer periphery of said body being of conical shape at said open end, means mounting said diaphragm under a lateral stress over the open end of said body by securing the inner periphery of said rim on the outer periphery of the open end of said body in press fit relationship, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant; and (c) means for pressurizing said chamber for deflecting said web into cooperating relation with said bearing surface.

13. Fluid supported apparatus cooperable with a bearing surface, which apparatus comprises, in combination:

(a) a flexible, resilient diaphragm of oblong shape having a flexibility along its sides which varies with the distance from its ends, said diaphragm having a surface opposed to said bearing surface and spaced therefrom by a fluid bearing, said diaphragm being movable toward and away from said bearing surface in response to variations in fluid pressure between said diaphragm and said bearing surface;

(b) means for applying fluid pressure against said diaphragm to bias it toward said bearing surface;

(c) means for mounting said diaphragm under a lateral stress, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant.

14. Fluid supported apparatus cooperable with a bearing surface, which apparatus comprises:

(a) a flexible, resilient diaphragm of oblong shape said diaphragm being thicker along its longitudinal side edges near the center of said diaphragm than near the ends thereof, said diaphragm thereby being deflected uniformly along a line running centrally thereof between the diaphragm ends, and said diaphragm having a surface opposed to said bearing surface and spaced therefrom by a fluid bearing, said diaphragm surface being movable toward and away from said bearing surface in response to variations in fluid pressure between said surfaces;

(b) means for applying fluid pressure against said diaphragm to deflect it toward said bearing surface;

(c) means for mounting said diaphragm under a lateral stress, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant.

15. Apparatus for supporting a plurality of magnetic heads having pole portions including signal gaps over a record surface on a fluid bearing, said apparatus comprising:

(a) a thin, flexible diaphragm of resilient material, said diaphragm having a rectangular shape, said heads being mounted on said diaphragm spaced from each other in side-by-side relation with their gaps disposed along a line running along said diaphragm from end to end, the faces of said pole portions being flush with a surface of said diaphragm;

(b) said diaphragm being movable toward and away from said record surface in response to variations in fluid pressure between said diaphragm and said bearing surface; means mounting said diaphragm under a lateral stress, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant;

(c) pneumatic means including in said support means for applying air pressure against said diaphragm for deflecting said diaphragm toward said record surface to position said pole portions in signal transducing relationship with said record surface, said diaphragm being of varying thickness along the side edges thereof, whereby all points along said line move equal distances when air pressure is applied to deflect said diaphragm.

16. Magnetic recording and reproducing apparatus comprising, in combination;

(a) a rotatable magnetic record having a magnetic recording surface;

(b) a housing member spaced from said recording surface and having an opening therein;

(c) a magnetic head;

(d) a flexible, resilient diaphragm carrying said magnetic head, said diaphragm being movable toward and away from said recording surface in response to variations in fluid pressure between said diaphragm and said bearing surface;

means for mounting said diaphragm under a lateral stress over the opening of said housing member facing said recording surface, said lateral stress being of a magnitude causing said diaphragm to exhibit a resonant frequency of vibration at least of the order of the frequency of said variations in said fluid pressure so that said diaphragm can follow said variations to maintain the spacing between said diaphragm and said record surface constant;

(e) and means for applying a fluid under pressure through the other of said ends of said opening whereby to deflect said diaphragm and dispose said head in transducing relationship with said recording surface.

References Cited by the Examiner

UNITED STATES PATENTS

| | | | |
|---|---|---|---|
| 2,911,483 | 11/1959 | Dopieralski | 179—100.2 |
| 2,937,240 | 5/1960 | Harker | 179—100.2 |
| 2,950,104 | 8/1960 | Bowser et al. | |
| 3,036,304 | 5/1962 | Willard. | |
| 3,065,460 | 11/1962 | Altenau et al. | 340—174.1 |
| 3,067,294 | 12/1962 | Siegemund | 179—100.2 |
| 3,151,319 | 9/1964 | Marrs | 179—100.2 X |

FOREIGN PATENTS

| | | |
|---|---|---|
| 832,036 | 4/1960 | Great Britain. |

OTHER REFERENCES

Pages 4–5, January 1961, IBM Technical Bulletin, vol. 3, No. 8.

BERNARD KONICK, *Primary Examiner.*